Patented Dec. 1, 1942

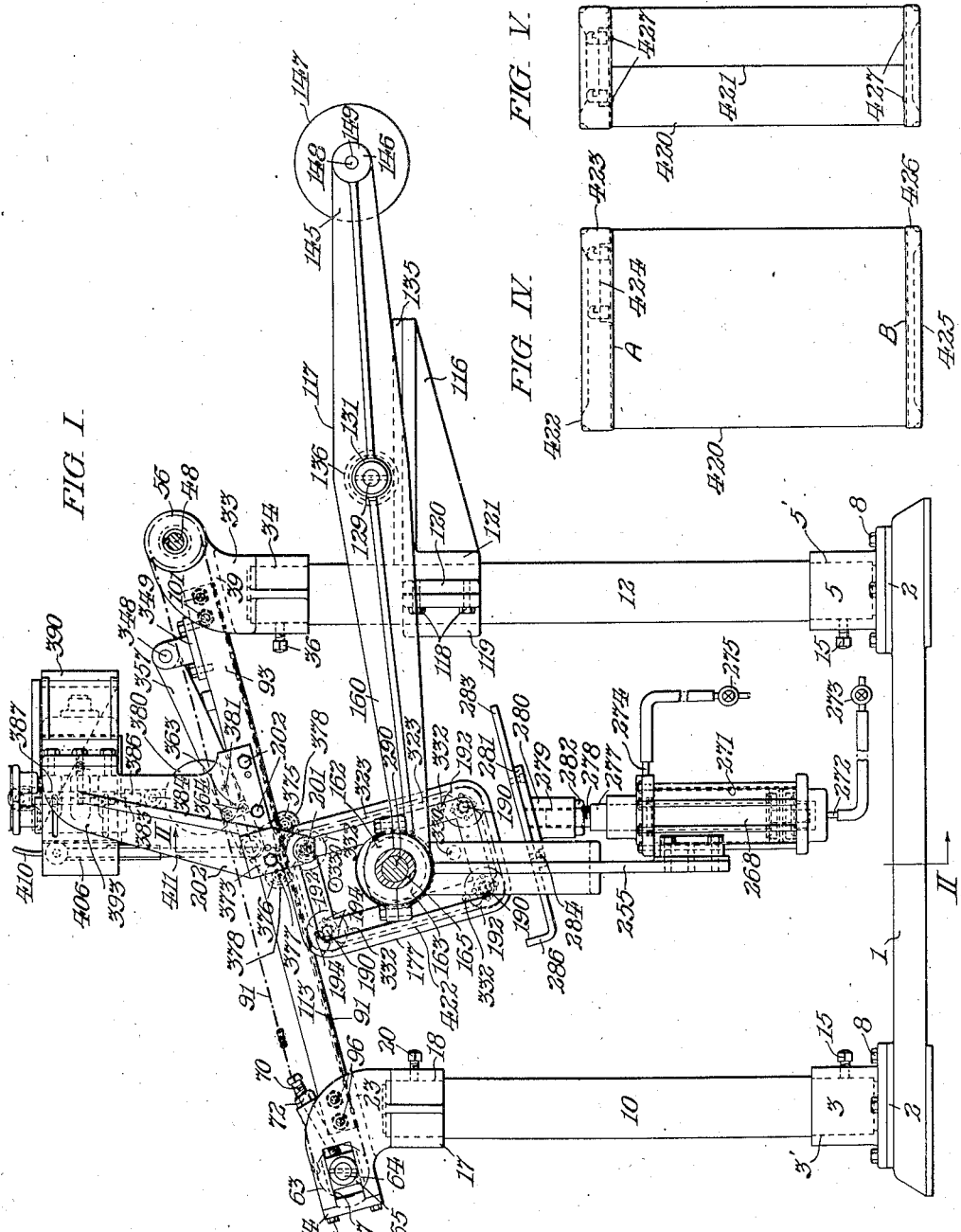

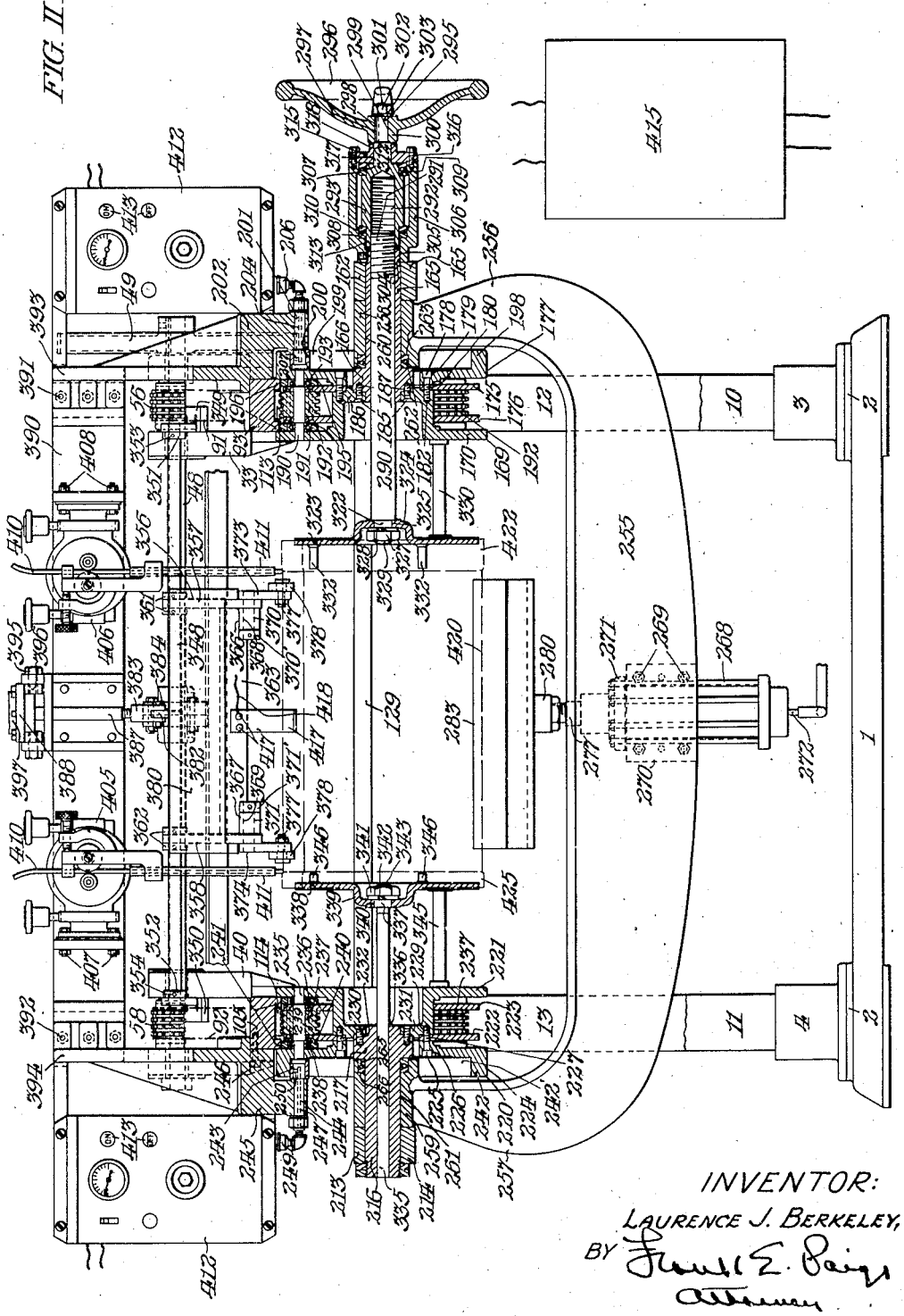

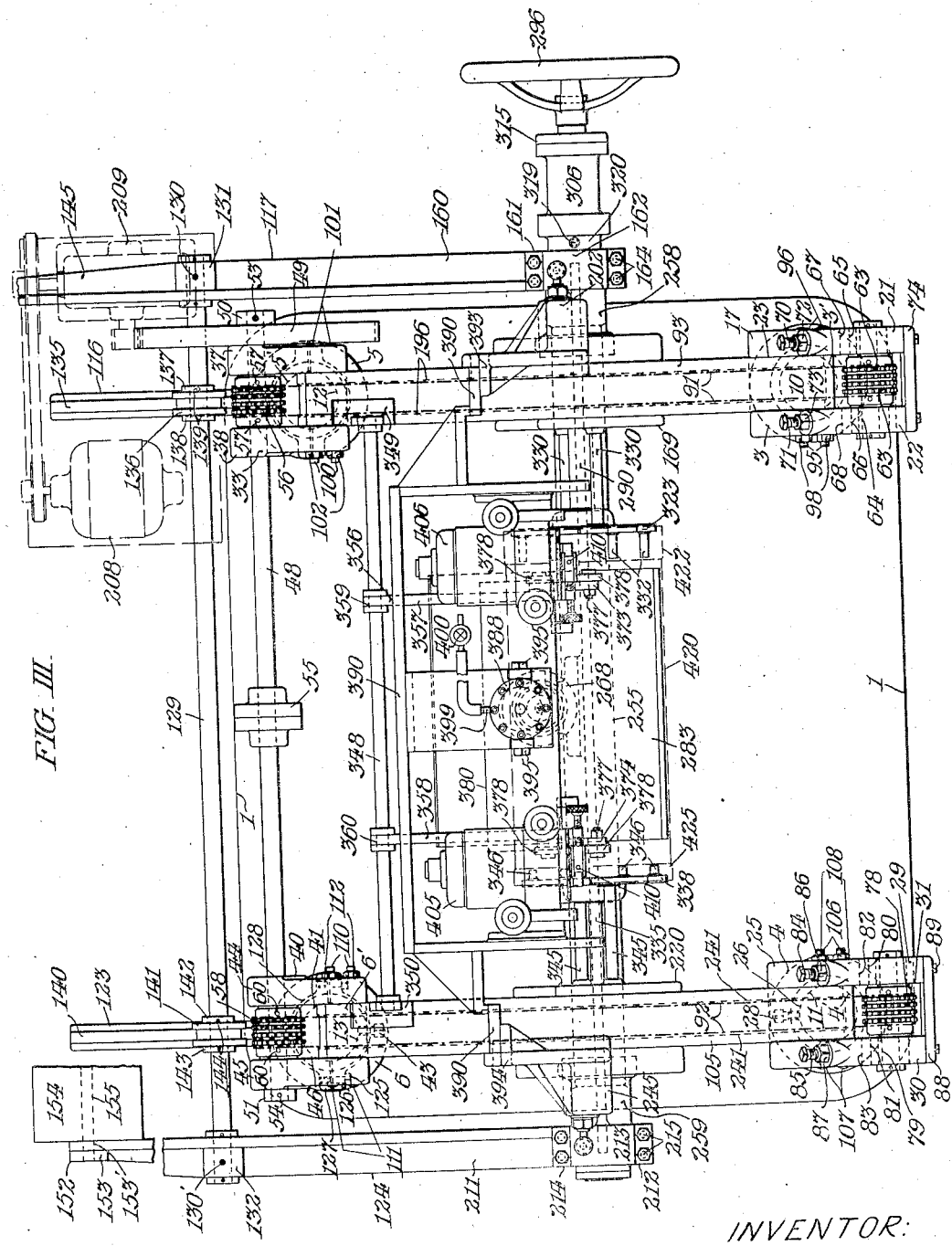

2,303,720

UNITED STATES PATENT OFFICE 2,303,720

AUTOMATIC ELECTRIC WELDING APPARATUS

Laurence J. Berkeley, Corry, Pa.

Application September 24, 1941, Serial No. 412,090

8 Claims. (Cl. 219—8)

My invention relates to apparatus for automatically electrically welding rotating objects wherein the surface to be welded is not regularly equidistant from the axis of rotation of the object. The form of my invention shown herein is particularly applicable for automatically electrically welding gun powder boxes such as are shown in Letters Patent No. 2,237,259 granted April 1, 1941, to Arthur Marland, as assignor to John Wood Manufacturing Company, Inc., and which boxes, in accordance with the specification requirements of the United States Government and other authorities, are rectangular in shape and approximately 9¾ inches by 16¼ inches by 28¾ inches in outside dimensions. Said boxes are fabricated by welding preformed flanged top and bottom closures to the respective open ends of the tubular body of the box which also has been preformed and butt-welded along its longitudinal seam.

In order to produce by automatic means a commercially satisfactory weld of such end closures to the body of a box, or to weld any other irregularly shaped object, it is essential that the surface of the object being welded be moved at a constant rate of speed with respect to a welding head maintained in fixed position. It is also essential that the surface to be welded be maintained at a constant predetermined distance from the welding wire or rod fed by such automatic electric welding head of any well-known construction.

Various endeavors have been made in the past to automatically electrically weld rotating surfaces not regularly equidistant from the axis of rotation of the object, such as by the use of air cylinders to maintain the object in position with respect to the welding head and effecting rotation of the object by means of irregular shaped internal gears, pinions, etc. Such devices have proved to be unsatisfactory because of the difficulties of effecting varying increases and decreases in the pressures in air cylinders necessitated by the turning movement of an irregularly balanced object with the resultant shifting of its center of gravity. The use of irregular shaped gears to effect turning movement of the object likewise has been proven to be unsatisfactory because of the shifting of the center of gravity of the irregular object as it is rotated, thus causing the object to move at varying rates of speed, with respect to the stationary welding head, depending upon the position of the object during its rotation.

One feature of my invention is the provision of automatic means for moving the surface to be welded of a rotating object not regularly equidistant from the axis of rotation of the object at a constant rate of speed with respect to a welding head maintained in fixed position.

Another feature of my invention is the provision of means to maintain the surface of such object at a constant predetermined distance from the welding wire or rod fed by an automatic electric welding head.

The use of my invention not only effects a material reduction in the cost of welding such objects as rectangular shaped powder boxes, but also enables the welding operations to be effected at greater rates of speed and with more uniform resultant welds than has heretofore been possible when such boxes are welded manually. The present emergency defense situation requires that powder boxes be made in such enormous quantities that there are not sufficient skilled manual electric welders available to meet the demands made on that highly skilled trade because of the additional demands made for such skilled workmen in other fields of defense work.

My invention includes the various novel features of construction and arrangement hereinafter more definitely specified.

In said drawings,

Fig. I is a right hand elevation, partly in section, of a structure embodying my invention.

Fig. II is a vertical sectional view, partly in elevation, taken on the lines II, II in Fig. I.

Fig. III is a plan view of the structure shown in Figs. I and II.

Fig. IV is a front elevation of a gunpowder box of the construction which is welded by the apparatus shown in Figs. I, II, and III.

Fig. V is a side elevation of the box shown in Fig. IV.

Referring to said drawings, said apparatus includes the rectangular base 1 which has at each of its four corners at pad 2. The supporting sockets 3, 4, 5, and 6 are rigidly mounted on their respective pads 2 by means of respective series of bolts 8 which extend through the respective flanges of said supporting sockets and engage the pads 2 and base 1. The supporting sockets 3, 4, 5, and 6 are respectively provided with recesses 3', 4', 5', and 6' for supporting the ends of two pairs of supporting standards, including the front pair of standards 10 and 11 respectively mounted in the sockets 3 and 4, and the rear pair of supporting standards 12 and 13 respectively mounted in the sockets 5 and 6. Said standards are rigidly held in their respective sockets by means of set screws 15. As shown in Fig. I, the pair of standards 12 and 13 is of greater height than the pair of standards 10 and 11.

The bracket socket supporting member 17 is provided with the annular recess 18 in engagement with and mounted on the upper end of the front standard 10, and said socket member 17 is rigidly connected to said standard 10 by means of the set screw 20. Said supporting member 17 is L-shaped and bifurcated at its upper end forming therein the arms 21 and 22 and the notched recess portion 23.

The bracket socket supporting member 25, identical with the supporting member 17, is provided with the annular recess 26 in engagement with and mounted on the upper end of the front standard 11, and said socket member 25 is rigidly connected to said standard 11 by means of the set screw 28. Said supporting member 25 is L-shaped and bifurcated at its upper end forming therein the arms 29 and 30 and the notched recess portion 31.

The bracket socket supporting member 33 is provided with the annular recess 34 in engagement with and mounted on the upper end of the rear standard 12, and said socket member 33 is rigidly connected to said standard 12 by means of the set screw 36. Said supporting member 33 is L-shaped and bifurcated at its upper end forming therein the arms 37 and 38 and the notched recess portion 39.

The bracket socket supporting member 40, identical with the supporting member 33, is provided with the annular recess 41 in engagement with and mounted on the upper end of the rear standard 13, and said socket member 40 is rigidly connected to said standard 13 by means of the set screw 43. Said supporting member 40 is L-shaped and bifurcated at its upper end forming therein the arms 44 and 45 and the notched recess portion 46.

As best shown in Fig. III, the shaft 48 is journaled in bearings formed in the L-shaped bifurcated arms 37, 38, 44, and 45 of the rear standards 12 and 13, and said shaft has rigidly mounted at the right hand end thereof the drive gear 49. Said shaft is prevented from being displaced axially by means of the hub 50 and collar 51 which are rigidly connected to the respective ends of the shaft 48 conveniently by set screws 53 and 54. Said shaft 48 is conveniently formed in two pieces connected by the coupling member 55.

Said shaft 48 has rigidly mounted thereon, between the bifurcated arms 37 and 38, the quadruple gear 56 which is rigidly fastened to the shaft 48 by means of tapered pins 57 extending through the respective opposite hub ends of said gear 56.

Said shaft 48 has rigidly mounted thereon at its opposite end, between the bifurcated arms 44 and 45, the quadruple gear 58 which is rigidly fastened to the shaft 48 by means of tapered pins 60 extending through the respective opposite hub ends of said gear 58.

The quadruple gear 63 is rigidly mounted on the shaft 64, the opposite ends of which are respectively journaled in the slide blocks 65 and 66, which are respectively slidably mounted in recesses 67 and 68 formed in the bifurcated arms 21 and 22 of the socket member 17. Said slide blocks 65 and 66 are provided respectively with adjusting screws 70 and 71 which extend in screw threaded relation through the bifurcated arms 21 and 22 and have their ends respectively in engagement with the slide blocks 65 and 66. Said adjusting screws are provided respectively with lock nuts 72 and 73 so that the gear 63, mounted on the shaft 64 journaled in the slide blocks 65 and 66, may be retained in predetermined adjusted position. I find it convenient to provide said bifurcated arms 21 and 22 with the end closure plate 74, which is rigidly mounted on the ends of said arms 21 and 22 conveniently by a series of cap screws 75.

The quadruple gear 78, identical with the quadruple gear 63, is rigidly mounted on the shaft 79, the opposite ends of which are respectively journaled in the slide blocks 80 and 81, which are respectively slidably mounted in recesses 82 and 83 formed in the bifurcated arms 29 and 30 of the socket member 25.

Said slide blocks 80 and 81 are provided respectively with adjusting screws 84 and 85 which extend in screw threaded relation through the bifurcated arms 29 and 30 and have their ends respectively in engagement with the slide blocks 80 and 81. Said adjusting screws are provided respectively with lock nuts 86 and 87 so that the gear 78, mounted on the shaft 79 journaled in the slide blocks 80 and 81, may be retained in predetermined adjusted position. I find it convenient to provide said bifurcated arms 29 and 30 with the end closure plate 88 which is rigidly mounted on the ends of said arms 29 and 30 conveniently by a series of cap screws 89.

The quadruple gears 56, 58, 63, and 78 are identical and of the same pitch diameter, and the gears 56 and 63 are connected by the quadruple chain 91 and the gears 58 and 78 are connected by the quadruple chain 92. It is obvious that said chains 91 and 92 may be maintained in adjusted position with respect to the gears which they connect by adjustment of the adjusting screws 70, 71, 84, and 85 respectively in engagement with the slide blocks 65, 66, 80, and 81.

The respective ends of the side frame member 93 are rigidly mounted in the notched recess portion 23 of the socket member 17 and the notched recess portion 39 of the socket member 33. Said frame member 93 is rigidly connected to the socket member 17 by two pairs of tapered pins 95 and 96 which respectively extend through the arms 21 and 22 into the frame member 93. I find it convenient to provide the pair of tapered pins 95 with screw threads at their outer ends engaging nuts 98 so as to facilitate the removal of said pair of pins 95. It is obvious that with the removal of the pins 95 the pair of pins 96 may be driven out of their tapered sockets by force applied to the smaller ends of the pins.

Said frame member 93 is rigidly connected to the socket member 33 by two pairs of tapered pins 100 and 101 which respectively extend through the arms 37 and 38 into the frame member 93. The pair of tapered pins 100 are screw threaded at their outer ends and provided with nuts 102 so as to facilitate removal of said pairs of pins as described above with respect to the pins 95 and 96.

The opposite ends of the side frame member 105 are rigidly mounted in the notched recess portion 31 of the socket member 25 and the notched recess portion 46 of the socket member 40. Said frame member 105 is rigidly connected to the socket member 25 by two pairs of tapered pins 106 and 107 which respectively extend through the arms 29 and 30 into the frame member 105. I find it convenient to provide the pair of tapered pins 106 with screw threads at their outer ends engaging nuts 108 so as to facilitate the removal of said pairs of pins as described above with respect to pins 95 and 96.

Said frame member 105 is rigidly connected to the socket member 40 by two pairs of tapered pins 110 and 111 which respectively extend through the arms 44 and 45 into the frame member 105. The pair of tapered pins 110 are screw threaded at their outer ends and provided with nuts 112 so as to facilitate removal of the pairs of pins as described above with respect to the pins 95 and 96.

As best shown in Fig. II, said frame member 93 is recessed at its underside to form the channel 113 which acts as a guide and rigid backing surface for the quadruple chain 91 and prevents said chain from being flexed beyond the plane of the bottom of the channel 113.

Said frame member 105 is likewise recessed at its underside to form the channel 114 which acts as a guide and rigid backing surface for the quadruple chain 92 and prevents said chain from being flexed beyond the plane of the bottom of the channel 114.

As best shown in Fig. I, the platform 116, supporting the pivoted counterweight arm member 117, is clamped to the rear standard 12, intermediate of its ends, by means of a series of bolts 118 extending through the semicylindrical clamping cap member 119 and into engagement with screw threaded holes in the flange 120 of the counterpart semicylindrical clamp member 121, conveniently formed as an integral part of the supporting platform member 116. The platform 123, supporting the pivoted counterweight arm member 124 which is the opposite counterpart of the arm member 117, is conveniently clamped to the rear standard 13, intermediate of its ends, by means of a series of bolts 125 extending through the semicylindrical clamping cap member 126 and into engagement with screw threaded holes in the flange 127 of the counterpart semicylindrical clamp member 128, conveniently formed as an integral part of the supporting platform member 123.

Said pivoted counterweight arm members 117 and 124 are rigidly connected to the opposite ends of their connecting shaft 129, conveniently by means of set screws 130 and 130' extending through the hubs 131 and 132 formed respectively as integral parts of said arm members 117 and 124.

As best shown in Fig. III, said platform 116 has formed at the upper part thereof the guide rail 135 forming a track for the grooved guide roller 136 which is journaled on the shaft 129, and said roller 136 is prevented from axial displacement on the shaft 129 by collars 137 and 138 which are rigidly connected to said shaft 129 conveniently by means of pins 139.

Said platform 123 has formed at the upper part thereof the guide rail 140 forming a track for the grooved guide roller 141 which is journaled on the shaft 129, and said roller 141 is prevented from axial displacement on the shaft 129 by collars 142 and 143 which are rigidly connected to said shaft 129 conveniently by means of pins 144. Said arm 117 includes the rear extension portion 145 having the boss 146 formed at the end thereof. The counterweight 147 is rigidly mounted on the stud shaft 148 which is in engagement with the opening 149 formed in said boss 146. Said arm 124 includes the rear extension portion 152 having the boss 153 formed at the end thereof. The counterweight 154 is rigidly mounted on the stud shaft 155 which is in engagement with the opening 153' in said boss 153. It is obvious that counterweights of other form may be used in lieu of the weights 147 and 154, for example, buckets carried by the extensions 145 and 152 and which may be filled with materials of predeterminable weights.

Said arm 117 includes the extension 160 which carries at its outer end the split bearing 161 including the semicylindrical bearing cap member 162 which is rigidly clamped to the counterpart semicylindrical bearing portion 163 of the arm 160 by means of a series of cap screws 164. The sleeve 165 is journaled in said split bearing 161 and, as shown in Fig. II, said sleeve 165 has at its left hand end an enlarged annular head 166 on which is mounted the frame 169. Said frame 169 includes the left hand rectangular member 170, the rectangular spacing plates 175 and 176, and the right hand frame member 177 which are rigidly clamped together conveniently by a series of screws 178 extending through holes 179 in said frame member 177 and holes 180 in said plate 175, into screw threaded engagement with tapped holes 182 in said left hand frame plate member 170. Said frame 169 is rigidly connected to the head 166 by a series of screws 185 extending through the annular recessed portion 186 of said frame member 170 and into screw threaded engagement with tapped holes 187 in said head 166.

Said rectangular gear frame 169 carries, intermediate of said frame plates 170 and 177, a series of four identical quadruple gear assemblies, one assembly being mounted at each of the four corners of said frame 169. Each of said assemblies includes a shaft 190, the opposite ends of which are mounted in openings formed in said frame members 170 and 177. Each of said shafts carries an annular ball bearing assembly 191, interposed between the frame member 170 and the spacing plate 176; a quadruple gear 192; and a bearing assembly 193 interposed between the spacing plate 175 and the right hand frame member 177. Each of said gears 192 is prevented from turning, and is maintained in fixed position conveniently by means of a series of four pins 194 which extend through said plate 175, gear 192, and plate 176. Each of said annular bearing assemblies 191 and 193 has rigidly mounted on its periphery a roller ring 195 for rolling engagement with rail tracks 196 formed at the opposite sides of the side frame member 93 by the formation of the channel recess 113 in said frame 93.

Said rectangular frame plate 177 is provided with the outwardly turned rectangular flange 198 which forms a guide track 199 which is engaged by the roller 200. Said roller 200 is journaled on the stud shaft 201 mounted in the lower end of the bracket 202 which is rigidly connected to the side frame member 93 by bolts 203. I find it convenient to provide said shaft 201 with the axial drilled passageway 204 which is provided at its outer end with the grease cup 206 by which grease may be forced through said opening 204 to said roller 200 through an opening 207 formed at the inner end of said shaft 201 and in communication with said axial opening 204.

The drive gear 49, rigidly mounted at the end of the shaft 48, is driven counterclockwise by the motor 208 through suitable gearing connections including the gear reduction unit 209 of any of the well-known conventional types. Such counterclockwise movement of the drive gear 49 causes the quadruple chain 91 to move continuously around the quadruple gears 56 and 63, and one or more of said quadruple gears 192, carried by the frame 169, is continually in engagement with the quadruple chain 91 as it moves from left to right, in Fig. I, in the guide channel 113 of the frame member 93. Said frame member 169 is limited in its transverse travel when a corner of the flanged guide track 199 reaches the roller 200, and said frame member 169 thereupon is caused to turn clockwise on its axis until the following quadruple gear 192 of the series is moved into engagement with the chain 91, which prevents further rotation of said frame member 169 and causes said frame member again to be carried along from left to right by engagement of the gears 192 with the chain 91 until such time as a corner of the flanged guide track 199 again reaches the roller 200, which causes said frame 169 again to be rotated clockwise about its axis.

Said arm 124 includes the extension 211 which carries at its outer end the split bearing 212 including the semi-cylindrical bearing cap member 213 which is rigidly clamped to the counterpart semicylindrical bearing portion 214 of the arm 211 by means of a series of cap screws 215. The sleeve 216 is journaled in said split bearing 212, and as shown in Fig. II, said sleeve 216 includes at its right hand end an enlarged annular head 217 on which is mounted the frame 220. Said frame 220 includes the right hand member 221, the rectangular spacing plates 222 and 223, and the left hand frame member 224 which are rigidly clamped together, conveniently by a series of screws 225 extending through holes 226 in said frame member 224 and holes 227 in said plate 222 into screw threaded engagement with tapped holes 229 in said right hand frame plate member 221. Said frame 220 is rigidly connected to the annular head 217 by a series of screws 230 extending through the annular recessed portion 231 of the frame member 221 and into screw threaded engagement with tapped holes 232 in the annular head portion 217.

Said rectangular gear frame 220 carries, intermediate of said frame plates 221 and 224, a series of four identical quadruple gear assemblies, one assembly being mounted at each of the four corners of said frame 220. Each of said assemblies includes a shaft 235, the opposite ends of which are mounted in openings formed in said frame members 221 and 224. Each of said shafts 235 carries an annular ball bearing assembly 236, interposed between the frame member 221 and the spacing plate 223; a quadruple gear 237; and a bearing assembly 238 interposed between the spacing plate 222 and the left hand frame member 224. Each of said gears 237 is prevented from turning, and is maintained in fixed position conveniently by means of a series of four pins 239 which extend through said plate 222, gear 237, and plate 223. Each of said annular bearings 236 and 238 has rigidly mounted on its periphery a roller ring 240 for rolling engagement with the rail tracks 241 formed at the opposite sides of the side frame member 105 by formation of the channel recess 114 in said frame 105.

Said rectangular frame plate 224 is provided with the outwardly turned rectangular flange 242 which forms a guide track 242' for engagement by the roller 243. Said roller 243 is journaled on the stud shaft 244 mounted in the lower end of the bracket 245 which is rigidly connected to the side frame member 105 by bolts 246. I find it convenient to provide said shaft 244 with the axial drilled passageway 247 which is provided at its outer end with the grease cup 249 by which grease may be forced through said opening 247 to said roller 243 through an opening 250 formed at the inner end of said shaft 244 and in communication with the axial opening 247.

Counterclockwise movement of the drive gear 49 causes counterclockwise movement of the gears 58 and 78 and causes the quadruple chain 92 to move continuously around said quadruple gears 58 and 78. One or more of said quadruple gears 237, carried by the frame 220, is continually in engagement with the quadruple chain 92 which moves in the same direction as the chain 91 at the opposite side of the apparatus. Said frame member 220 is limited in its transverse travel, in the same manner as the frame member 169, when a corner of the flanged guide track 242' reaches the roller 243, and said frame member 220 thereupon is caused to turn clockwise on its axis until the following quadruple gear 237 of the series is moved into engagement with the chain 92 which prevents further rotation of said frame member 220 and causes said frame member 220 again to be carried along, in the same manner as the frame member 169, by engagement of the gears 237 with the chain 92 until such time as a corner of the guide track flange 242 again reaches the roller 243, which causes said frame 220 again to be rotated about its axis.

The U-shaped bracket 255 includes the side arms 256 and 257 which have bosses 258 and 259 at their respective upper ends and in which are formed the bearings 260 and 261. Said bearing 260 is mounted for freedom of turning movement on the sleeve 165 between the counterweight arm bearing 160 and the annular head 166 of said sleeve 165. I find it convenient to interpose the thrust bearing 262 between said head 166 and bearing 260, and, as shown in Fig. II, said thrust bearing 262 is mounted in the annular recess 263 formed in said bearing boss 258. The opposite U-bracket bearing 261 is mounted correspondingly with freedom for turning movement on the sleeve 216 between the counterweight arm bearing 212 and the annular head 217 of said sleeve 216. The thrust bearing 265, mounted in the recess 266 formed in said bearing boss 259, is interposed between the head 217 and the bearing 261.

The air cylinder 268 is rigidly mounted on and carried by the cross member of the U-bracket 255, intermediate of the arms 256 and 257, by means of a series of bolts 269, which extend through the opposite side bracket flanges 270 of the casing 271 of said air cylinder 268. Said air cylinder 268 is of the well-known conventional type and includes a double acting piston mounted for reciprocation in the cylinder chamber 271. Air under pressure is admitted to and exhausted from the cylinder chamber 271 at the underside of the piston through the piping connection 272, under control of a two-way valve 273 of any of the well-known types; and air under pressure is admitted to and exhausted from the cylinder chamber 271 at the upper side of the piston through the piping connection 274 also controlled by a two-way valve 275.

Said air cylinder includes the plunger rod 277 having the male screw thread 278 at its upper end in screw threaded engagement with the screw threaded opening 279 of the socket base 280 of the inclined elevated table support 281. I find it convenient to provide said screw thread of the plunger with the lock nut 282 to maintain said support in its desired predetermined position. As shown in Fig. I, the inclined table 283 is rigidly mounted on the upper side of said support 281, conveniently by a series of screws 284 which extend through the flanges of said support 281 and into screw threaded holes in said table 283. Said inclined table 283 has at its lower edge the upturned flange 286 to prevent objects from sliding off when they are placed on the table.

The shaft 290 is mounted to reciprocate horizontally in the bearing sleeve 165, and, as shown in Fig. II, said shaft 290 has the screw thread 291 at its right hand end for engagement with the internal axial screw thread 292 of the nut 293. Said nut 293 has at its right hand end, in integral relation therewith, the cylindrical reduced shaft portion 295 on which the handwheel 296 is rigidly mounted. I find it convenient to provide said shaft 295 with the key 297 for engagement with the key slot 298 formed in the axial opening 299 of the hub 300 of said handwheel 296. The screw threaded outer end 301 of said shaft 295 is provided with the clamping nut 302 and lockwasher 303 to prevent axial displacement of said handwheel 296 from said shaft 295.

The right hand end 304 of the sleeve 165 is screw threaded for engagement with the axial threaded opening 305 of the cylindrical nut housing member 306. Said housing 306 has the offset internal recess portions 307 and 308, in which are mounted the thrust bearings 309 and 310. The cylindrical nut 293 is provided with the reduced portions 312 and 313 forming journals by which said nut 293 is mounted in said bearings 309 and 310. As shown in Fig. II, the housing member 306 is provided at its right hand end with the closure plate 315 which is rigidly fastened to said housing 306 by means of a series of cap screws 316, which extend through said closure plate 315 into engagement with tapped holes in the cylindrical wall of said housing 306. Said closure plate 315 is provided with the axial opening 317 forming a bearing for the journal 318 of the nut 293. The housing 306 is fastened rigidly to the screw threaded end 304 of the sleeve 165 by means of the set screw 319 which extends through the reduced left hand end 320 of said housing 306 and into engagement with the screw threaded end 304 of the sleeve 165.

As shown in Fig. II, the shaft 290 is provided at its left hand end with the reduced portion 322 on which is rigidly mounted the rectangular supporting plate 323 which has the axial offset portion 324 provided with the axial opening 325 which is in engagement with the reduced portion 322 of said shaft 290. Said supporting plate 323 is held rigidly mounted on the shaft 290 by the nut 327, and lockwasher 328, in engagement with the screw thread 329 formed on the end of the reduced portion 322 of said shaft 290.

Said supporting plate 323 is connected to the frame 169, and adapted to be turned contemporaneously therewith, by means of two rods 330, the left hand ends of which are reduced and extend through countersunk holes in the supporting plate 323, with the ends of said rods 330 being riveted over in the countersunk portion of the holes. The right hand ends of said rods 330 extend through and are free to reciprocate in aligned bearing holes formed in the frame members 170, 176, 178, and 177. Said supporting plate 323 is provided with the series of studs 332, rigidly mounted on the plate 323, for engagement with the flanged top closure of a powder can which is to be automatically welded to the tubular body of the can by the apparatus disclosed herein and as hereinafter described.

Referring to the left hand side of the structure shown in Fig. II, the shaft 335 is push fitted in the axial opening through the sleeve 216 and said shaft 335 is welded to the sleeve 216 as at 336. Said shaft 335 is provided at its right hand end with the enlarged head portion 337 on which is rigidly mounted the rectangular supporting plate 338, which has the axial offset portion 339 provided with the axial opening 340 which is in engagement with the head 337 of said shaft 335. Said supporting plate 338 is held rigidly mounted on the shaft 335 by the nut 341, and lockwasher 342, in engagement with the screw thread 343 formed on the end of the enlarged portion 337 of said shaft 335.

The supporting plate 338 is connected to the frame 220, and adapted to be turned contemporaneously therewith, by means of two rods 345, the right hand ends of which are reduced and extend through countersunk holes in the plate 338, with the ends of said rods riveted over in the countersunk portion of the holes. The left hand ends of said rods 345 are push fitted in aligned holes formed in the frame member 221.

Said supporting plate 338 is provided with a series of studs 346, rigidly mounted on the plate 338, for engagement with the bottom flanged closure of a powder can to be welded to the tubular body of the can, as hereinafter described.

The opposite ends of the shaft 348 are journaled respectively in bearing brackets 349 and 350 rigidly mounted on the respective top surfaces of the side frame members 93 and 105. Said shaft 348 is prevented from axial displacement by the collars 351 and 352 which are rigidly connected to said shaft 348 by their respective set screws 353 and 354. Said shaft 348 carries the frame member 356 provided with the arms 357 and 358, the respective upper ends of which are provided with bearing openings 359 and 360 for the shaft 348. Said frame 356 is prevented from axial displacement on the shaft 348 by the pairs of collars 361 and 362 rigidly fastened to said shaft 348 at the opposite sides of each of said frame arms 357 and 358. Said frame 356 is provided with the horizontal reinforcing bar 363, the opposite ends of which are rigidly connected to said arms 357 and 358, conveniently by a series of cap screws 364 which engage tapped holes in the ends of said bar 363.

As shown in Figs. II and III, the lower ends of said arms 357 and 358 are provided with bearing bosses 366 and 367 having the axial bearing openings 368 and 369 in which are journaled shafts 370 and 371.

The inner ends of said shafts 370 and 371 are provided respectively with collars 370′ and 371′ to prevent axial displacement of said shafts in their respective bearings 368 and 369. Said shafts 370 and 371 have welded thereto at their respective outer ends the angle roller supporting frames 373 and 374, each of which is provided with two holes 375 and 376 in which are mounted stud shafts 377 carrying rollers 378 free to turn thereon. The inner ends of each of said shafts 377 extend through the frames 373 and 374 and are screw threaded and provided with clamping nuts.

I have found it convenient to provide the frame 356 with the cylindrical weight 369. The ends of said weight 380 are slotted for engagement with the arms 357 and 358 and said weight is mounted rigidly on the reinforcing bar 363 by means of bolts 381. Said weight has at its upper side, in integral relation therewith, the eyebolt 382 which is engaged between the bifurcated ends of connecting link 383 and pivotally connected thereto by the bolt 384. Said link 383 is provided with the screw threaded socket 386 which is engaged by the depending screw threaded end of the plunger shaft 387 of the air cylinder 388. Said air cylinder is mounted on the top frame supporting member 390, the opposite ends of which are rigidly connected by bolts 391 and 392 to the upper arms 393 and 394 of the side frame brackets 202 and 245.

The air cylinder 388 is utilized to raise the weighted frame 356 and said air cylinder is rigidly mounted on the top frame support 390 by means of a series of bolts 395 which extend through the opposite side bracket flanges 396 of the casing 397 of said cylinder 388. Said air cylinder is of a well-known conventional type and includes a piston mounted for reciprocation in the cylinder chamber 397. Air under pressure is admitted to and exhausted from the under side of the piston through the piping connection 399 under control of a two-way valve 400 of any of the well-known types. Although I have found it convenient to utilize said air cylinder 388 only to effect raising movement of the weighted frame 356, it is obvious that suitable piping and valve connections could be provided to utilize said air cylinder also to effect lowering movement of the frame 356.

As best shown in Fig. II, the automatic electric welding heads 405 and 406, respectively right hand and left hand assemblies, are mounted on the top frame support 390, conveniently by bolts 407 and 408. Said welding heads may be of any of the well-known types, such as "Weldomatic" heads manufactured and sold by Westinghouse Electric and Manufacturing Company, which are the type chosen for illustration in the drawings. As is well known in the art, the welding wire electrode 410 is furnished on spools, not shown, and fed automatically by the welding head, at a predetermined rate of speed to the point where the weld is to be made, through nozzles 411 which are adjusted to a position of about an inch from the work, with the welding wire electrode extending from the end of the nozzle to the work.

Said automatic welding heads 405 and 406 are connected by suitable wiring to the operator's panel 412, including an "off" and "on" switch 413, and to a control cabinet 415 connected to a suitable source of 60 v. direct current. The work to be welded is grounded to complete the welding circuit by means of the slightly flexible copper element 417 in contact with the work, which in the apparatus shown is a rectangular shaped powder can. Said ground element 417 is rigidly connected to and depends from the weighted cross bar 363 of the frame member 356, conveniently by bolts 417', and said ground element 417 is provided with a suitable ground lead 418. The ground element 417 is so positioned that it is continually in pressure contact with the tubular body of the powder can during such time as the can is being held between the supporting plates 323 and 338, with the frame 356 in lowered position.

The apparatus shown in Figs. I, II, and III is designed particularly to automatically electrically weld rectangular shaped gunpowder boxes of the type shown in Figs. IV and V. Referring to Figs. IV and V, such boxes include a tubular body portion 420 preformed from a flat sheet of steel and butt welded forming the longitudinal seam 421. The top closure 422 is provided with the rectangular flange 423 formed in integral relation therewith, and said top closure is provided with the circumferential flanged opening 424 through which the box may be filled and emptied. Said opening 424 is adapted to be sealed by a removable cover, not shown. The bottom closure 425 of the box is provided with the rectangular flange 426 formed as an integral part of the bottom closure 425.

The top and bottom closures 422 and 425 and the body portion 420 may be assembled directly by the operator in the apparatus and the parts held in assembled position between the supporting plates 323 and 338. However, before the top and bottom closures are welded to the body portion 420 along the lines A and B entirely around the box by the apparatus shown herein, said top and bottom closures may be preassembled to the body 420 by a series of tack welds 427.

*Operation*

The top and bottom closures of rectangular shaped gunpowder boxes of the type shown in Figs. IV and V are automatically electrically welded to the body portion by the apparatus shown in Figs. I, II, and III, as follows:

It is of course to be understood that the frame assemblies 169 and 220 are assembled coaxially in the apparatus and with the corresponding four sides of both frames 169 and 220 in the same planes; and that the supporting plates 323 and 338, respectively connected to the frames 169 and 220 and adapted to be turned contemporaneously therewith, are mounted on the frames so that the corresponding sides of the plates 323 and 338 are respectively in planes parallel to the planes of the corresponding sides of the frames 169 and 220.

Having been so assembled initially, it is obvious that the positions of the frames 169 and 220 with their respective supporting plates 323 and 338 do not change relatively, because said frames 169 and 220 are moved contemporaneously by continual engagement of their respective quadruple gears 192 and 237 with their respective quadruple chains 91 and 92, which in turn are in continuous engagement with their respective quadruple gears 63 and 78 and their respective driving quadruple gears 56 and 58 which are rigidly mounted on the shaft 48 turned by the drive gear 49 connected thereto.

The operator places on the inclined table 283 in its lowered position a preformed powder box with its top and bottom closures 422 and 425 positioned at the ends of the tubular body portion 420 and so held either manually or by a series of tack welds. The box is placed on the table with the longitudinal axis of the box horizontal and with the circumferential opening 424 of the box to the right, as shown in Fig. II. The operator positions the box on the table so that it will be intermediate of the supporting plates 323 and 338. The two-way valve 273 is then opened to admit air under pressure to the under side of the piston in the cylinder chamber 271, thereby elevating the table 283 carrying the box until the longitudinal axis of the box coincides approximately with the axis of the supporting plates 323 and 338. Whereupon, the valve 273 is closed and the table and box remain in such elevated position.

The thread at the right hand end of the shaft 298 is right hand and the operator causes the shaft 298 and the supporting plate 323, carried at the end thereof, to move horizontally to the left in Fig. II by counterclockwise movement of the handwheel 296 which is rigidly connected to the nut 293 in engagement with said screw thread at the end of the shaft 290.

The operator continues to turn the handwheel 296 counterclockwise to thereby move the powder box to the left in Fig. II until the plate 338 is in supporting engagement with the rectangular flange 426 of the bottom closure and with the studs 346 of the plate 338 in contact with said bottom closure 425. Movement of the shaft 290 to the left also moves the plates 323 into supporting engagement with the rectangular flange 423 of the top closure 422 and with the series of studs 332 of the supporting plate 323 in engagement with said top closure 422.

The two-way valve 273 is then turned to permit the air under pressure to be exhausted from the under side of the piston in the air cylinder chamber 271 and the valve 275 is turned to permit the introduction of air under pressure to the upper side of said piston to thereby cause the inclined table 283 to be moved downwardly and out of supporting engagement with the powder box, which is now supported at its opposite end flanged closures by the supporting plates 323 and 338.

The two-way valve 400 of the air cylinder 388 is then turned to exhaust the air under pressure from the under side of the piston in said cylinder 388 to permit the weighted frame member 356 to be lowered by gravity until the pairs of rollers 378 bear upon the tubular body portion 420 of the box at a point in close proximity to the point of welding. Lowering of the frame member 356 also brings the ground element 417, connected to and depending from the weighted cross bar 363 of the frame member 356, into pressure contact with the tubular body of the can.

When the powder can is thus engaged by the supporting plates 323 and 338 so that the studs 332 and 346 are respectively in contact with the top and bottom closures of the can, as above described, the junction of the can body 420 and the top closure 422 is in a plane coinciding with the axis of the welding wire electrode 410 of the welding head 406 and the junction of the body portion 420 and the bottom closure 425 is in a plane coinciding with the axis of the welding wire electrode 410 of the welding head 405.

The operator then moves the switch 413 in the operator's panel 412 to "on" position to close the welding circuit.

Movement of the switch 413 to "on" position also closes the circuit to the motor 208 which, through suitable gearing connections including the gear reduction unit 209, turns the drive gear 49 counterclockwise. Such counterclockwise movement of the drive gear 49, rigidly mounted at the end of the shaft 48, causes the quadruple gears 56 and 58, also rigidly fastened to the shaft 48, to turn counterclockwise contemporaneously. Counterclockwise movement of the quadruple gears 56 and 58 causes the quadruple chains 91 and 92 to be moved contemporaneously counterclockwise on their respective quadruple gears 63 and 78 mounted on the front socket supporting members 17 and 25. Such counterclockwise movement of the quadruple gears 56, 58, 63, and 78 causes the quadruple chains 91 and 92 to be moved contemporaneously from left to right, in Fig. I, in their respective guide channels 113 and 114 formed in the side frame members 93 and 105.

One or more of the series of quadruple gears 75 192 carried by the frame 169 and of the quadruple gears 237 carried by the frame 220 are continually in engagement with their respective quadruple chains 91 and 92 which causes contemporaneous movement of said frames 169 and 220 and plates 323 and 338 in supporting engagement with the powder can.

Both guide tracks 199 and 242' are identical in configuration with the configuration of the powder box being welded. Accordingly, said frame member 169 is limited in its transverse travel when a corner of the guide flange track 199, coinciding in outline with a corner of the powder box being welded, reaches the roller 200, and said frame member 169 and powder box thereupon is caused to turn clockwise on its axis until the following quadruple gear 192 of the series is moved into engagement with the chain 91 which prevents further rotation of the frame member 169 and powder box and causes said frame and box again to be carried along from left to right, in Fig. I, by engagement of the gears 192 with the chain 91, until such time as a corner of the flanged guide track 199 again reaches the roller 200, which causes said frame 169 and box again to be rotated about its axis. It is obvious that such movement and rotation of the frame member 169 is contemporaneously duplicated with respect to the frame member 220, by engagement of the roller 243 with the guide track 242' of the frame plate 224.

The frame members 169 and 220, carried by the pivoted counterweight arms 117 and 124, have one or more of their respective quadruple gears 192 and 237 maintained continually in engagement with the quadruple chains 91 and 92 by means of the counterweights 147 and 154 of the arms 117 and 124, which counterweights continually stress said arms in a clockwise direction. However, said frames 169 and 220 are prevented from clockwise movement by the engagement of the rollers 195 and 240 with their respective rail tracks 196 of the side frame member 93 and the rail tracks 241 of the side frame member 105.

It is obvious from Fig. I of the drawings that any movement of the frames 169 and 220 in planes parallel to the frame members 93 and 105 merely causes said arms 117 and 124 to be moved frontwards or backwards on the guide track rails 135 and 140 without changing the effective forces of the counterweights 147 and 154.

The welding wire electrode 410 is fed continuously and automatically by the respective welding heads 405 and 406 during such time as the switch 413 is turned to "on" position and thereby causes a continuous weld to be produced along the lines A and B as the powder box is automatically turned, as hereinabove described. When the powder box has been returned to the position at which it was when the operator turned the switch 413 to "on" position to initiate the welding operation, the switch 413 is moved by the operator to "off" position which breaks the welding circuit and simultaneously opens the circuit to the motor 208 which stops further rotation of the drive gear 49. The two-way valve 400 is then opened to admit air under pressure to the under side of the piston in the air cylinder 388 which causes the plunger shaft 387 of the air cylinder 388 to be moved upwardly and carries with it the weighted frame member 356 and rollers 378 out of engagement with the body portion 420 of the powder can. The two-way valves 273 and 275 are then operated to admit air under pressure to the under side of the piston in the air cylinder 268 and to exhaust air from the upper side of the piston to thereby raise the table 283 into engagement with the powder box which is still supported between the supporting plates 323 and 338. The handwheel is then turned clockwise to move the shaft 290 to the right, as in Fig. II, which retracts the supporting plate 323 from the top rectangular flange 423 and permits the operator to move the box to the right to disengage the bottom rectangular flange 426 from the left hand supporting plate 338.

The box then rests upon the inclined table 283 and the air cylinder 268 is again operated by means of the valves 273 and 275 to lower the table 283 to its initial position. Thereupon, the operator replaces the completely welded box with a box to be welded, and the above-described cycle of operation is repeated.

I do not desire to limit myself to the details of construction and arrangement of the structure shown herein, as it is obvious that various modifications may be made therein without departing from the essential features of my invention. For example, the shaft 290, carrying the supporting plate 323, may be reciprocated by any of the well-known means, such as an air cylinder having a double acting piston; and the work to be welded may be mounted between supporting plates of which only one is driven by the driving connections herein shown, with the opposite plate merely being mounted on a shaft journaled in the bearing formed at the outer end of the counterweight arm.

I claim:

1. In automatic electric welding apparatus including a welding head which progresses a welding wire electrode automatically; the combination with movable and rotatable supporting means for engagement with the work to be welded; of means for effecting engagement and disengagement of said supporting means with said work; an endless chain; driving means for said chain; means operatively connecting said chain with said work supporting means for moving said work supporting means; a guide track in operating relation to said supporting means; and means in engagement with said guide track to limit the movement of said guide track, supporting means, and the work supported to a predetermined path of travel coincident with the surface of the work to be welded.

2. In automatic electric welding apparatus including a welding head which progresses a welding wire electrode automatically; the combination with movable and rotatable supporting means for engagement with the work to be welded; of means for effecting engagement and disengagement of said supporting means with said work; an endless chain; driving means for said chain; means operatively connecting said chain with said work supporting means for moving said work supporting means; a guide track in operating relation to said supporting means; means in engagement with said guide track to limit the movement of said guide track, supporting means, and the work supported to a predetermined path of travel coincident with the surface of the work to be welded; and means maintaining said connecting means continually in engagement with said endless chain.

3. In automatic electric welding apparatus including a welding head which progresses a welding wire electrode automatically; the combination with movable and rotatable supporting means for engagement with the work to be welded; of means for effecting engagement and disengagement of said supporting means with said work; an endless chain; driving means for said chain; a pivoted and movable arm having a counterweight at one end; means, carried by the opposite end of said counterweight arm, operatively connecting said chain with said work supporting means for moving said work supporting means; whereby, said connecting means is maintained continually in engagement with said chain by means of the effective forces of said counterweight; a guide track in operating relation to said supporting means; and means in engagement with said guide track to limit the movement of said guide track, supporting means, and the work supported to a predetermined path of travel coincident with the surface of the work to be welded.

4. In automatic electric welding apparatus including a welding head which progresses a welding wire electrode automatically; the combination with a movable and rotatable supporting plate for engagement with the work to be welded; of means for effecting engagement and disengagement of said supporting plate with said work; an endless chain; driving means for said chain; a pivotally mounted movable arm having a counterweight at one end; a frame, carried by the opposite end of said arm; a series of immovable gears carried by said frame and operatively connected to said chain; means connecting said frame with said plate for moving said plate; a guide track in operating relation to said frame; and roller means in engagement with said guide track to limit the movement of said guide track, supporting means, and the work supported to a predetermined path of travel coincident with the surface of the work to be welded.

5. In automatic electric welding apparatus including a welding head which progresses a welding wire electrode automatically; the combination with a movable and rotatable supporting plate for engagement with the work to be welded; of means for effecting engagement and disengagement of said supporting plate with said work; an endless chain; driving means for said chain; a pivotally mounted movable arm having a counterweight at one end; a frame, carried by the opposite end of said arm; a series of immovable gears carried by said frame and operatively connected to said chain; reciprocating shaft means connecting said frame with said plate for effecting movement of said plate; a guide track carried by said frame; and roller means in engagement with said guide track to limit the movement of said guide track, supporting means, and the work supported to a predetermined path of travel coincident with the surface of the work to be welded.

6. In automatic electric welding apparatus including a welding head which progresses a welding wire electrode automatically; the combination with a pair of movable and rotatable supporting plates for engagement with the work to be welded and for supporting said work therebetween; of means for effecting engagement and disengagement of said supporting plates with said work; a pair of endless chains; driving means for said chains; a pair of pivotally mounted movable arms each having a counterweight at one end and a frame pivotally mounted at the opposite end; two immovable series of gears, one series being carried by each of said frames and respectively operatively connecting each frame to its driving chain; reciprocating shaft means connecting one of said frames with its plate for effecting movement of said plate; means connecting the other frame with its plate; a guide track in operating relation to one of said frames; and roller means in engagement with said guide track to limit the movement of said guide track, supporting means, and the work supported to a predetermined path of travel coincident with the surface of the work to be welded.

7. In automatic electric welding apparatus including a welding head which progresses a welding wire electrode automatically; the combination with a pair of movable and rotatable supporting plates for engagement with the work to be welded and for supporting said work therebetween; of means for effecting engagement and disengagement of said supporting plates with said work; a pair of endless chains; driving means for said chains; a pair of pivotally mounted movable arms each having a counterweight at one end and a frame pivotally mounted at the opposite end; two immovable series of gears, one series being carried by each of said frames and respectively operatively connecting each frame to its driving chain; reciprocating shaft means connecting one of said frames with its plate for effecting movement of said plate; means connecting the other frame with its plate; two guide tracks, one of which is in operating relation to each of said frames; and roller means respectively in engagement with each of said guide tracks to limit the movement of said guide tracks, supporting means, and the work supported therebetween to a predetermined path of travel coincident with the surface of the work to be welded.

8. An automatic electric welding apparatus including a welding head which progresses a welding wire electrode automatically; the combination with a supporting framework having two pairs of standards, each pair including a front and rear standard; of gears rotatably mounted at the upper ends of each standard; two endless chains respectively connecting gears mounted on a front and a rear standard; driving means for effecting contemporaneous movement of said gears and chains; a pair of pivotally mounted movable arms, each having a counterweight at one end and a frame pivotally mounted at the opposite end; two immovable series of gears, one series being carried by each of said frames and respectively operatively connecting each frame to its driving chain; a pair of movable and rotatable supporting plates for engagement with the work to be welded and supporting said work therebetween, one plate being carried by each frame, and adapted to be turned contemporaneously therewith; two guide tracks, one of which is in operating relation to each of said frames; roller means in engagement with each of said guide tracks to limit the movement of said tracks, supporting means and the work to be supported to a predetermined path of travel coincident with the surface of the work to be welded; and a U-shaped yoke, the opposite arms of which are pivotally in supporting relation respectively to said frames and the supporting plates connected to said frames.

LAURENCE J. BERKELEY.